US00RE33856E

United States Patent [19]

Giddings et al.

[11] E Patent Number: Re. 33,856

[45] Reissued Date of Patent: Mar. 24, 1992

[54] TERPOLYMER COMPOSITIONS FOR AQUEOUS DRILLING FLUIDS

[75] Inventors: David M. Giddings, Sugar Land; Charles D. Williamson, Houston, both of Tex.

[73] Assignee: Nalco Chemical Company, Naperville, Ill.

[21] Appl. No.: 144,260

[22] Filed: Jan. 15, 1988

Related U.S. Patent Documents

Reissue of:

[64] Patent No.: 4,678,591
Issued: Jul. 7, 1987
Appl. No.: 848,527
Filed: Apr. 7, 1986

[51] Int. Cl.[5] ..... C09K 7/02

[52] U.S. Cl. ..... 507/106; 507/107; 507/108; 507/120; 507/121

[58] Field of Search ..... 252/8.51, 8.511, 8.514; 524/705, 735

[56] References Cited

U.S. PATENT DOCUMENTS

| | | | |
|---|---|---|---|
| 2,650,197 | 8/1953 | Rahn | 252/8.511 |
| 2,718,497 | 9/1955 | Oldham et al. | 252/8.51 |
| 2,935,504 | 5/1960 | King et al. | 252/8.511 |
| 3,266,887 | 8/1966 | Kramer et al. . | |
| 3,639,263 | 2/1972 | Troscinski et al. . | |
| 3,700,728 | 10/1972 | Moschopedis et al. | 252/8.51 X |
| 3,985,659 | 10/1976 | Felicetta et al. | 252/8.511 |
| 4,374,738 | 2/1983 | Kelly | 252/8.511 |
| 4,502,964 | 3/1985 | Giddings et al. . | |
| 4,547,299 | 10/1985 | Lucas | 252/8.51 |
| 4,650,593 | 3/1987 | Slingerland | 252/8.51 |
| 4,676,317 | 6/1987 | Fry et al. | 523/130 X |

FOREIGN PATENT DOCUMENTS 72445 2/1983 European Pat. Off. .

OTHER PUBLICATIONS

Amer. Petroleum Institute, publication RP 13 (B), 6th Ed., Apr. 1976, pp. 1-33, "Standard Procedure for Testing Drilling Fluids".

*Primary Examiner*—John F. Terapane
*Assistant Examiner*—Gary Geist
*Attorney, Agent, or Firm*—Arnold, White & Durkee

[57] ABSTRACT

A method of improving high temperature fluid loss and rheology stabilization of high calcium brine clay-containing oil well drilling fluids which comprises adding thereto a stabilizing amount of a water-soluble terpolymer composition comprising:

| Ingredients | % by weight |
|---|---|
| NaAMPS | 72-3.8 |
| N,N-dimethylacrylamide | 13.5-0.7 |
| Acrylonitrile | 9.5-0.5 |

said composition containing lignin, modified lignin, brown coal or modified brown coal in an amount ranging between 5-95% with the lignin, modified lignin, brown cell or modified brown coal having been present during the polymerization of the water-soluble polymer.

2 Claims, No Drawings

TERPOLYMER COMPOSITIONS FOR AQUEOUS DRILLING FLUIDS

Matter enclosed in heavy brackets [ ] appears in the original patent but forms no part of this reissue specification; matter printed in italics indicates the additions made by reissue.

INTRODUCTION

A serious problem is encountered when clay-based oil well drilling fluids are subjected to conditions of high temperature and high pressure in conjunction with utilization of high calcium-containing brines which are used to prepare these drilling fluids. When these conditions exist, conventional drilling fluid polymeric additives such as acrylamide polymers, when used as stabilizers for these fluids, tend to be rendered ineffective.

In U.S. Pat. No. 4,502,964, there is shown an improved high temperature fluid loss additive and rheology stabilizer for high temperature oil well drilling fluids which comprises a water-soluble terpolymer having the following compositions:

| Ingredients | Mole % Preferred | Mole % General |
|---|---|---|
| 2-acrylamido-2-methylpropane-sulfonic acid, sodium salt (AMPS[1]) | 53.5 | 51–59 |
| N,N-dimethylacrylamide | 16.6 | 6–28 |
| acrylonitrile | 29.8 | 20–35 |

[1]AMPS, a registered trademark of Lubrizol, Inc., 2-acrylamido-2-methylpropane sulfonic acid, Na salt.

These polymers are further described in this patent as having a molecular weight below one million. They preferably have a molecular weight range within the range of 10,000–500,000. The other properties of these polymers and their efficacy as high temperature fluid loss additives are further described in this patent. The disclosure of U.S. Pat. No. 4,502,964 is incorporated into this disclosure by reference and forms a part hereof.

Resinex, a sulfonated lignite complexed with a sulfonated phenolic resin, is a commercially available high temperature, high pressure fluid loss additive for drilling muds. It is effective in controlling filtration properties in both fresh and sea water muds with high concentrations of soluble calcium.

If it were possible to provide high temperature fluid loss additives having superior activity to the activity of either the polymers described U.S. Pat. No. 4,502,964 or the Resinex additive, an advance in the art would be afforded.

THE INVENTION

In accordance with the invention, there is provided a method for improving high temperature fluid loss and rheology stabilization of high calcium brine clay-containing oil well drilling fluids which comprises adding thereto a stabilizing amount of a water-soluble terpolymer composition comprising: polymer prepared by polymerizing the following monomer ingredients:

| Ingredients | % by weight |
|---|---|
| NaAMPS | 72–3.8 |
| N,N-dimethylacrylamide | 13.5–0.7 |

-continued

| Ingredients | % by weight |
|---|---|
| Acrylonitrile | 9.5–0.5 |

said composition containing lignin, modified lignin, brown coal or modified brown coal in an amount ranging between 5–95% with the lignin, modified lignin, brown coal or modified brown coal having been present during the polymerization of the water-soluble polymer.

THE LIGNIN, MODIFIED LIGNIN, BROWN COAL OR MODIFIED BROWN COAL

A variety of material falling within this generic description may be used in the practice of the invention. One of the most common materials is lignite which is a brown coal in which the original structure of the wood is still recognizable. It is commonly known that lignite may be reacted with sulfuric acid or $SO_3$ to produce a sulfonated lignite. A related product that may also be substituted is lignin which is a byproduct formed in the processing of wood for the manufacture of paper.

It can be modified to provide a lignosulfonate or a cyano derivative as described in U.S. Pat. No. 3,639,263.

Another related product is leonardite which is a naturally oxidized product with higher oxygen and moisture content than lignite.

Another brown coal-type material is humic acid which is a completed polycyclic polycarboxylic acid which can be converted into its salt form e.g. alkali metal, ammonia or amine, or it can be sulfonated. Such products as well as other derivatives of humic acid are described in U.S. Pat. No. 3,266,887. The disclosure of which is incorporated herein by reference.

The polymer portion of the composition used to practice the invention is prepared in accordance with the teachings of U.S. Pat. No. 4,502,964. The reaction temperature and times may be varied with the reaction time being temperature dependent, e.g. the higher the temperature the shorter the reaction time. Generally, temperatures within the range of about 35°–80° C. may be employed. Although, the temperature and reaction times vary, they are further governed by the amount of catalyst as well as the ratio of the reactants. Often, routine experimentation must be used to optimize the process.

As indicated, the compositions are prepared by conducting the polymerization in the presence of the lignin, modified lignin, brown coal or modified brown coal.

The amount of brown coal combined with the polymer as indicated ranges between 5–95%, preferably 20–50% and most preferably 20–35% by weight.

One of the suprising facts of the invention is that the entire broad range of lignin, modified lignin, brown coal or modified brown coal used shows excellent results are achieved in providing fluid loss control.

The composition of this invention provides good results at dosages ranging between 0.5–10 lbs. per barrel. A preferred dosage range is between 1–5 lbs. per barrel. The dosages are varied depending upon the conditions and type of formation being treated.

| Method for Preparing the Compositions of the Invention Composition I | | |
|---|---|---|
| | Component | Weight Percent |
| (1) | Deionized Water | 55.77 |
| (2) | Causticized Lignite | 9.53 |
| (3) | 50% Na AMPS Solution | 28.87 |
| (4) | Dimethylacrylamide | 2.71 |
| (5) | Acrylonitrile | 1.90 |
| (6) | EDTA | .10 |
| (7) | Sodium Bisulfite | .56 |
| (8) | Ammonium Persulfate | .56 |
| | | 100.00 |

Charge (1) and (2) to reactor with stirring, heat to 60° C. and continue stirring at 60° C. for 30 minutes. Charge (3)-(6). Close in reactor, pull vacuum, break with nitrogen, repeat. Charge catalyst pair (7) and (8), portionwise (approximately 0.14 weight percent) at one hour intervals. A small exotherm (10°-15° C.) may occur and the solution should gain viscosity. It appears that a Brookfield viscosity greater than 200 centipoise is necessary for peak product performance. Continue adding catalyst doses until residual monomer levels are at acceptable levels (less than 1% for AMPS and dimethylacrylamide, and less than 25 ppm for acrylonitrile). Typical residuals for open pot laboratory reactions are as follows:

| Monomer | Residual |
|---|---|
| ACN | 1.7 ug/g |
| AMPS | .07% |
| diMeAcAM | <.05% |

Using this general preparative method, the following compositions in Table I were prepared:

TABLE I

| Composition No. | Product Compositions Weight Percents NaAMPS | N,N-dimethyl-acrylamide | Acrylonitrile | Lignite |
|---|---|---|---|---|
| 1 | 50.5 | 9.5 | 6.7 | 33.3 |
| 2 | 60.7 | 11.4 | 7.9 | 20 |
| 3 | 72.0 | 13.5 | 9.5 | 5 |
| 4 | 3.8 | 0.7 | 0.5 | 95 |
| 5 | 54.3 | 12.4 | — | 33.3 |
| 6 | 47.2 | 18.4 | 1.1 | 33.3 |
| 7 | 48.6 | 14.7 | 3.4 | 33.3 |
| 8 | 51.6 | 6.7 | 8.4 | 33.3 |
| 9 | 56.9 | 2.1 | 7.7 | 33.3 |
| 10 | 59.3 | — | 7.4 | 33.3 |
| 11 | 66.7 | — | — | 33.3 |

The following variations contain the same base polymer with different lignin/lignite variations:

NaAMPS (50.5%), N,N-dimethylacrylamide (9.5%), acrylonitrile (6.5%), lignin/lignite variation (33.3%).

| Composition No. | Lignin/Lignite Variation |
|---|---|
| 12 | Ca lignosulfonate |
| 13 | Na lignosulfonate |
| 14 | Lignin |
| 15 | Sulfomethylated lignite |
| 16 | Sulfonated lignite |

FLUID TEST PROCEDURES

The variations were tested in a high temperature, high pressure fluid loss additive test which is described in detail in the American Petroleum Institute publication RP13(B). Improved fluid loss control was observed for the variations tested. The results in both unaged muds and muds aged overnight at 350° F. are shown in Table II. The base mud used for testing consisted of:

| | |
|---|---|
| 280 g | water |
| 15 g | bentonite |
| 40 g | kaolinite |
| 4 g | chrome lignosulfonate |
| 294 g | barite |
| 10.6 g. | sea salt |

Using the above test procedures, the compositions of Table I were evaluated with the results being shown in Table II.

TABLE II

| Composition No. | Concentration (lbs/bbl) | HTHP Fluid Loss (ml) Unaged | Aged 350° F. |
|---|---|---|---|
| Blank | — | dry @ 27 min | dry @ 28 min |
| 1 | 2 | 80 | 70 |
| 2 | 2 | 64 | 62 |
| 3 | 2 | 76 | 66 |
| 4 | 2 | 142 | 134 |
| 5 | 2 | 90 | 70 |
| 6 | 2 | 78 | 60 |
| 7 | 2 | 74 | 62 |
| 8 | 2 | 96 | 66 |
| 9 | 2 | 98 | 94 |
| 10 | 2 | 112 | 94 |
| 11 | 2 | 84 | 70 |
| 12 | 2 | dry @ 29 min 30 sec | 82 |
| 13 | 2 | 134 | 102 |
| 14 | 2 | dry @ 27 min | 96 |
| 15 | 2 | dry @ 29 min 30 sec | 124 |
| 16 | 2 | 124 | 96 |

The products of the invention, either in solution or in dry form, provide effective and improved performance as fluid loss additive in oil field drilling fluids. These products show especially improved performance at elevated temperatures. These additives may be used in a wide range of drilling fluid types including the following:

(1) fresh water muds (2) fresh water muds contaminated with calcium or other multivalent ion (3) sea water muds (4) gypsum muds (5) lime muds

Having thus described our invention it is claimed as follows:

1. A method of improving high temperature fluid loss and rheology stabilization of high calcium brine clay-containing aqueous oil well drilling fluids which comprises adding thereto a stabilizing amount of a water-soluble terpolymer composition comprising: a polymer prepared by polymerizing the following monomer ingredients:

| Ingredients | % by Weight |
|---|---|
| [NaAMPS] 2-acrylamido-2-methyl-propane sulfonic acid, sodium salt | 72-3.8 |
| N,N-dimethylacrylamide | 13.5-0.7 |
| Acrylonitrile | 9.5-0.5 |

said composition containing lignin, modified lignin, brown coal or modified brown coal in an amount ranging between 5-95% with the *lignin, modified lignin,* brown coal or modified brown coal having been present during the polymerization of the water-soluble polymer, where the lignin, modified lignin, brown coal or modified brown coal is from the group consisting of lignites, sulphonated lignites, lignins, leonardites, lignosulfonates, alkali metal humic acid salts, humic acids, and sulphonated humic acids.

[2. The method of claim 1 where the lignin, modified lignin, brown coal or modified brown coal is present in an amount ranging between 5-95% by weight.]

3. The method of claim 1 where the lignin, modified lignin, brown coal or modified brown coal is present in an amount ranging between 20-35% by weight.

* * * * *

UNITED STATES PATENT AND TRADEMARK OFFICE

CERTIFICATE OF CORRECTION

PATENT NO. : RE. 33,856

DATED : March 24, 1992

INVENTOR(S) : Giddings, et al

It is certified that error appears in the above-identified patent and that said Letters Patent is hereby corrected as shown below:

In the ABSTRACT, the third line from the end, after brown and before or, change "cell" to --coal--.

Signed and Sealed this

Twenty-second Day of June, 1993

*Attest:*

Michael K. Kirk

MICHAEL K. KIRK

*Attesting Officer*

*Acting Commissioner of Patents and Trademarks*